Figure 1:
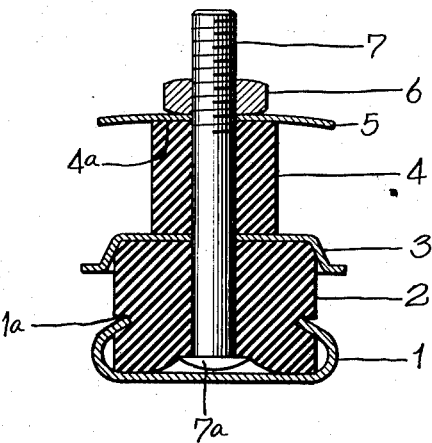

Sept. 18, 1951     R. E. MILLER     2,568,507

SELF-RETAINING LEG MOUNT FOR FURNITURE

Filed Feb. 28, 1950

INVENTOR.
ROBERT E. MILLER
BY
Davis Hoxie Faithfull
HIS ATTORNEYS

Patented Sept. 18, 1951

2,568,507

UNITED STATES PATENT OFFICE 2,568,507

SELF-RETAINING LEG MOUNT FOR FURNITURE

Robert Ellis Miller, Bronxville, N. Y.

Application February 28, 1950, Serial No. 146,808

6 Claims. (Cl. 16—42)

This invention relates to appliances for the legs of furniture and specifically to an improved leg mount on which the furniture is adapted to move substantially noiselessly over the floor.

Heretofore, furniture leg mounts have been constructed with inverted U-type retainer devices so that when the mount is pushed into a hole in the bottom of the furniture leg, the ends of the inverted U will rest against the side walls of the hole. The friction between the ends of the inverted U and the side walls of the leg hole impedes the withdrawal of the mount from the leg. In some instances a notch or rim has been formed in the side walls of the leg hole to accommodate the engaging ends of the retainer. These prior mounts are not entirely satisfactory for various reasons, among which are their inability to remain firmly in place when the leg hole does not conform in size or shape to the hole for which the mount is designed, their lack of noise-insulating qualities, and their complexity.

The principal object of the present invention is to provide a furniture leg mount which overcomes these disadvantages of the prior mounts.

A leg mount made according to my invention comprises a metal cap or other floor-engaging element secured to a resilient member, which may be of rubber. The cap is adapted to rest upon and move over the floor surface, the resilient member being interposed between the cap and the bottom of the furniture leg to provide a cushioning action. An assembly pin projects upwardly from the cushion through a retainer seat supported by the cushion and extending into the hole in the bottom of the furniture leg when the mount is in place. Above the seat is a retainer in the form of a polygonal piece of flexible material, preferably spring metal, which is secured to the pin and held thereby against the seat. The corners of the retainer protrude laterally from the seat and impinge acutely upon the side walls of the leg hole so that a firm "bite" into these walls is obtained as the mounting is pushed into place.

With this construction, when the retainer is forced upwardly into the leg hole by pressure on the bottom of the mount, the side walls of the hole will flex the outer or corner parts of the retainer downwardly more or less, depending upon the size and shape of the hole. Thus, the retainer provides the necessary "bite" to hold the mount firmly in place, regardless of whether the hole is round or square and even though the size of the hole does not conform to a certain standard. Also, in the downward flexing of the outer parts of the retainer as it is pushed into the hole, the central part acts on the pin to raise the assembly pin away from the bottom cap and enhance the noise-insulating quality of the mount. When the pressure used to insert the mount is released, the corners of the retainer are automatically pressed with greater force against the side walls of the hole, due to expansion of the cushion.

Figures 2, 3:
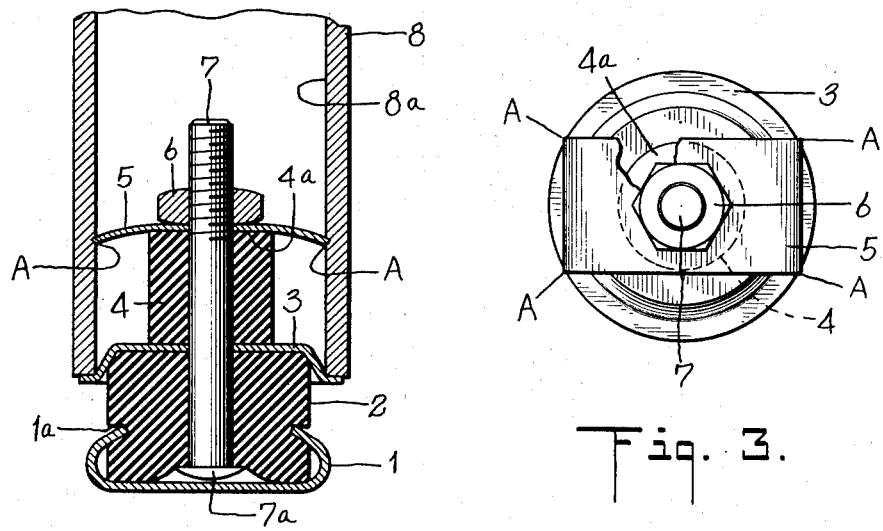

For a better understanding of the invention, reference may be had to the accompanying drawing, in which Fig. 1 is a vertical sectional view of a preferred form of the new mount;

Fig. 2 is a view similar to Fig. 1 but showing the mount locked in place in a furniture leg, and Fig. 3 is a top view of the mount shown in Figs. 1 and 2.

Referring to the drawing, the mount comprises a floor-engaging element 1 which, as illustrated, is in the form of a metal guide shoe. The shoe is secured to an overlying cushion 2, which may be made of rubber, as by turning the edges of the shoe inwardly into a circumferential recess 1a in the cushion. Above the cushion and supported by it is a metal base member 3 forming a laterally projecting shoulder which is engageable with the bottom of the furniture leg, as will be described presently.

A rubber washer 4 rests on top of the base member 3 and is adapted to enter the hole in the bottom of the furniture leg. At its upper end, the washer 4 forms a seat 4a for a polygonal retainer 5 of flexible material, preferably spring metal. As shown, the retainer 5 is rectangular. Its corners protrude outwardly from the seat member or washer 4 and are normally curved downwardly. The assembly is held tightly together by a keeper, such as a nut 6, on the upper part of a pin or bolt 7 extending upwardly from the cushion through openings in the base member 3, the washer 4 and the retainer 5. The head 7a of the assembly pin is located between the cushion and the shoe 1 but is normally spaced from the latter.

When the upper part of the mount is engaged in the hole 8a of a furniture leg 8, the corners of the spring metal retainer 5 are forced downward as necessary to adapt the mount to the internal dimensions and form of the leg hole 8a. That is, the smaller the space in which the retainer 5 is confined, the more the corners of the retainer will be flexed downward by engagement with the side walls of the hole 8a when the retainer is forced upwardly into the hole. The retainer is forced into the leg hole, by pressure applied to the bottom of the shoe 1, until the shoulder of the base member 3 engages the bottom of the furniture leg. Due to the downward flexing of the outer parts of the retainer 5 when it is pushed into the hole 8a, the central part of the retainer acts upon the nut 6 to draw the bolt or pin head 7a away from the shoe 1 and further compress the cushion. When the upward pressure against the bottom of shoe 1 has been released, after engagement of base member 3 with the bottom of the furniture leg, the rubber parts 2 and 4 will expand and act to draw the central part of the retainer 5 downward, thereby increasing the pressure between the corners of the retainer and the side walls of the hole 8a. This increases the "biting" of the retainer corners into the side walls of the hole, so that a firmer grip is obtained between the mount and the leg at the points A.

The sharp corners of the spring retainer 5 provide better holding qualities than an ordinary flat surface or toe engaging the side walls of the hole 8a, due to the fact that all of the pressure of the spring 5 is concentrated at four points. The oblique angle at which the retainer spring 5 approaches the walls of the leg hole 8a affords a strong resistance to buckling of the spring when a withdrawing force is applied to the mount, as contrasted with prior mounts where a comparatively weak pull will buckle the retainer. Moreover, the new mount can be applied with equal facility to furniture legs having bottom holes of round or square cross section and of different sizes, and in cases where the holes are of square or rectangular cross section the corners of the retainer 5 may be engaged with either the flats or the corners defining the hole. Thus, the mount is practically universal in its application, and when it has been applied to the leg hole, regardless of its form or whatever its size may be, within reasonable limits, the strong gripping action of the corners of the spring retainer insure against accidental removal of the mount from the leg.

The sound insulating properties of the new mount are highly effective as a result of the floating or cushioned coupling between the shoe 1 and the spring retainer 5. As previously mentioned, the flexing of the retainer acts to draw the assembly pin 7 away from the metal shoe 1, and this insures against metal-to-metal contact between these parts. The cushion 2 serves to keep the mount tight at all times, as well as to absorb shocks and vibrations incident to moving the furniture.

I claim:

1. A mount for insertion in a hole in the bottom of a furniture leg, which comprises a floor-engaging element, a cushion secured to said element and positioned thereon to lie between the bottom of the leg and said element, a retainer seat of flexible, compressible material supported by the cushion and adapted to enter said hole, an assembly pin projecting upwardly from the cushion and through the seat, and a polygonal flexible retainer secured to the pin and held thereby with its central portion against the compressible seat, the retainer having sharp corners protruding laterally from the seat and being made of a hard material of sufficient size to cause said corners to engage and bite into the side walls of the leg hole.

2. A mount according to claim 1, in which the retainer is a rectangular sheet of spring metal.

3. A mount according to claim 1, in which the corners of the retainer are normally bowed downward.

4. A mount according to claim 1, in which the pin has a head disposed between the cushion and the floor-engaging element but spaced from said element.

5. A mount according to claim 1, comprising also a rigid base member interposed between the compressible retainer seat and the cushion and engageable with the leg bottom around the hole, said member having an opening through which the pin extends with a clearance.

6. A mount according to claim 1, comprising also a keeper on the pin engaging the retainer and normally holding the cushion and the seat compressed between the keeper and the lower end of the pin.

ROBERT ELLIS MILLER.

REFERENCES CITED

The following references are of record in the file of this patent:

UNITED STATES PATENTS

| Number | Name | Date |
|---|---|---|
| 1,029,705 | McIntyre | June 18, 1912 |
| 1,580,781 | Fitch | Apr. 13, 1926 |
| 2,155,829 | Herold | Apr. 25, 1939 |
| 2,238,705 | Miller | Apr. 15, 1941 |
| 2,454,739 | Hendrickson | Nov. 23, 1948 |
| 2,513,193 | Miller | June 27, 1950 |